US009292365B2

(12) United States Patent
Knox et al.

(10) Patent No.: US 9,292,365 B2
(45) Date of Patent: Mar. 22, 2016

(54) PRIORITISING EVENTS TO WHICH A PROCESSOR IS TO RESPOND

(71) Applicant: Imagination Technologies Limited, Kings Langley (GB)

(72) Inventors: David William Knox, Bristol (GB); Adrian John Anderson, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/667,755

(22) Filed: Mar. 25, 2015

(65) Prior Publication Data

US 2015/0277998 A1  Oct. 1, 2015

(30) Foreign Application Priority Data

Mar. 25, 2014 (GB) .................................. 1405323.5
Jan. 21, 2015 (GB) .................................. 1501024.2

(51) Int. Cl.
*G06F 13/00* (2006.01)
*G06F 9/54* (2006.01)
*G06F 9/30* (2006.01)

(52) U.S. Cl.
CPC ............ *G06F 9/542* (2013.01); *G06F 9/30141* (2013.01)

(58) Field of Classification Search
CPC .......... G06F 9/542; G06F 13/24; G06F 13/26
USPC .................................. 710/260, 264; 719/318
See application file for complete search history.

(56) References Cited

U.S. PATENT DOCUMENTS

| 5,317,745 A * | 5/1994 | Chan .......................... G06F 9/30 710/264 |
| 5,408,643 A * | 4/1995 | Katayose ............ G06F 11/0721 714/55 |
| 6,449,675 B1 * | 9/2002 | Moyer .................. G06F 9/4812 710/269 |
| 7,586,927 B1 | 9/2009 | Liu et al. |
| 2007/0074214 A1 * | 3/2007 | Ueno ...................... G06F 9/542 718/100 |

FOREIGN PATENT DOCUMENTS

GB  2495959 A  5/2013

* cited by examiner

*Primary Examiner* — Andy Ho
(74) *Attorney, Agent, or Firm* — Vorys, Sater, Seymour and Pease LLP; Vincent M DeLuca

(57) ABSTRACT

A computer system comprises a processor (106) configured to respond to events from a plurality of sources, and a prioritisation module (104) implemented in hardware and configured to prioritise the events for the processor. The prioritisation module comprises one or more decision modules (108) comprising multiple, prioritised inputs (110) configured to receive respective event flags relating to events from respective sources. The decision module stores a source identifier of the source corresponding to the highest priority asserted event flag. The processor can read the stored source identifier to identify the source of an event to which the processor is to respond. In this way, the decision as to which event a processor should respond to next is offloaded from the processor and implemented in hardware in the prioritisation module. This can reduce the workload of the processor and thereby result in a more efficient computer system.

20 Claims, 5 Drawing Sheets

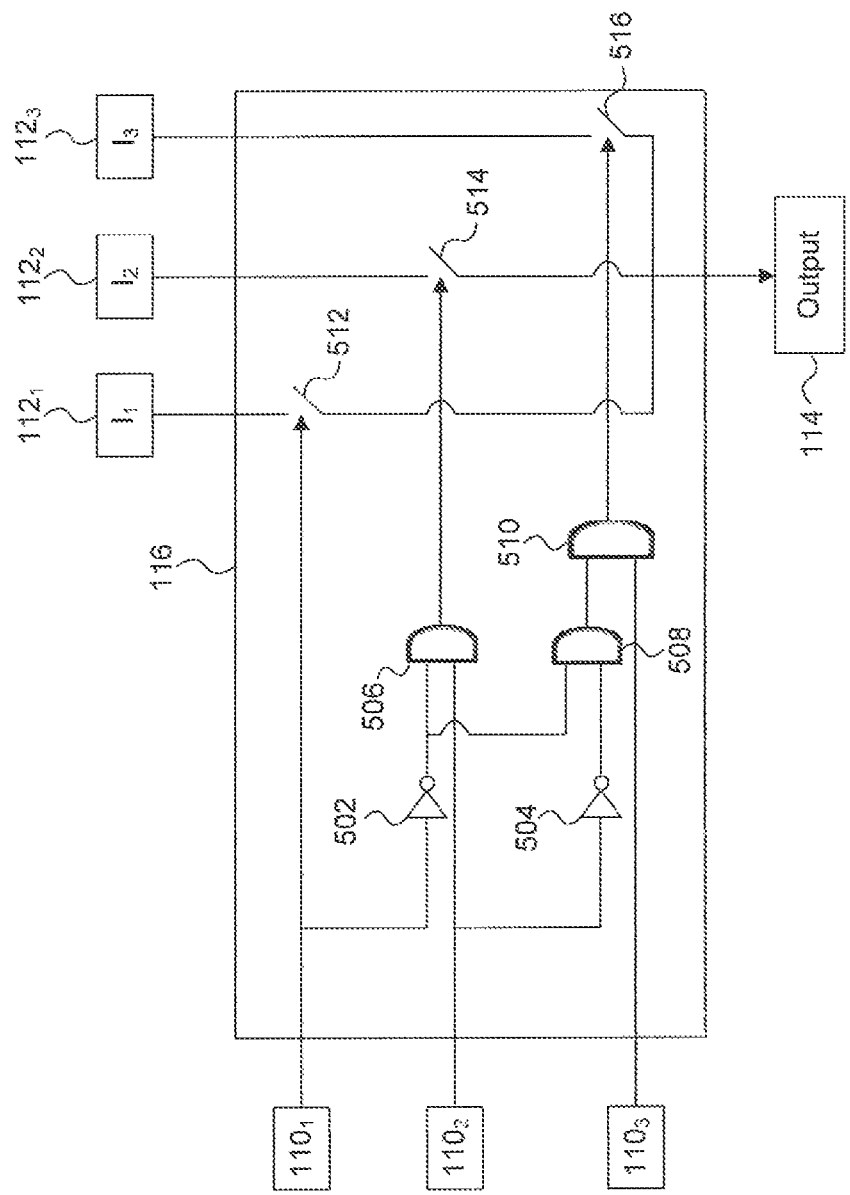

PRIORITISING EVENTS TO WHICH A PROCESSOR IS TO RESPOND

BACKGROUND

Many computer systems include one or more processors which are configured to execute computer instructions. Computer systems also often include other devices such as a memory and/or peripheral devices such as a camera or keyboard, etc. Events can occur at the devices in a computer system which require a processor to respond, e.g. which require the processor to execute some instructions relating to the events. There are many different types of event to which a processor may respond, which may be generated by many different sources (e.g. devices) of the computer system. For example, in a communications processing system, an event may be generated by hardware in response to the filling of a buffer of received sampled data. In another example, an event may be generated by software when a memory buffer can be released for re-use.

When an event occurs which requires a response from the processor an indication that the event is pending (e.g. an event flag) may be sent to the processor to indicate that the processor should respond to the event. There may be times at which events are occurring at a faster rate than the rate at which the processor can handle the events. Therefore the processor can use a queuing system to queue the events to be processed. The queues are implemented in software at the processor, and as an example there may be a queue for each source of events, or alternatively one queue may be used to queue events generated by more than one source. When the processor is ready to respond to a new event, a decision can be made as to which of the queued events the processor should respond to next. This decision is implemented in software at the processor, and may for example be based upon a set of rules. For example, events from some sources may be prioritised over events from other sources. The decision may also be based on the length of time that an event has been waiting for a response from the processor.

The processor takes time and processing resources for queuing the events in the software queues and to implement the software instructions of the decision process in order to determine which event the processor is to respond to next. Reducing the time and/or processing resources that the processor spends for queuing events and to implement the decision process may provide a more efficient computer system in terms of how the processor responds to events that occur in the computer system. Any improvements to the efficiency of a computer system are often beneficial.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The inventors have realised that the queuing of events and the decision logic for deciding which event a processor should respond to, can be offloaded from the processor. In particular, the event queues and the decision logic may be implemented in hardware and the result of the decision made by the decision logic (i.e. which event the processor should respond to next) may be provided to the processor from the hardware. In this way, the processor does not need to spend time or processing resources to determine which event to respond to, as the decision process is offloaded from software and implemented in hardware. In examples described herein, the decision logic is implemented in a prioritisation module which is implemented in hardware and coupled to the processor.

There is provided a computer system comprising: a processor configured to respond to events from a plurality of sources; and a prioritisation module implemented in hardware and configured to prioritise the events for the processor, the prioritisation module comprising one or more decision modules, wherein at least one of the one or more decision modules comprises: a plurality of inputs configured to receive respective event flags relating to events from respective sources, wherein each of the inputs is associated with a respective priority; OR logic configured to output a flag corresponding to the result of a logical OR operation on the event flags received at the plurality of inputs; identification logic configured to identify which of the inputs to receive an asserted flag has the highest priority; and an output register configured to store a source identifier of the source for which an asserted event flag is received at the identified input; wherein the processor is configured to: (i) respond to receiving an asserted flag outputted by one of said one or more decision modules, by reading the source identifier stored in the output register of said one of the decision modules, and (ii) use said source identifier to identify a source of an event to which the processor is to respond.

There is provided a method of responding to events in a computer system comprising a processor configured to respond to events from a plurality of sources, and a prioritisation module implemented in hardware and configured to prioritise the events for the processor, wherein the prioritisation module comprises one or more decision modules which each have a plurality of inputs associated with respective priorities, the method comprising: receiving respective event flags relating to events from respective sources at the inputs of at least one of the one or more decision modules; outputting, from OR logic of the at least one decision module, a flag corresponding to the result of a logical OR operation on the event flags received at the plurality of inputs; for each of the at least one decision module, identifying which of the inputs of the decision module to receive an asserted flag has the highest priority; storing, in a respective output register of each of the at least one decision module, a source identifier of the source for which an asserted event flag is received at the identified input of the decision module; responsive to the processor receiving an asserted flag outputted by one of said one or more decision modules, the processor reading the source identifier stored in the output register of said one of the decision modules; and the processor using the source identifier to identify a source of an event to which the processor is to respond.

There is provided a prioritisation module implemented in hardware and configured to be coupled to a processor configured to respond to events from a plurality of sources, wherein the prioritisation module is configured to prioritise the events for the processor, the prioritisation module comprising: one or more decision modules, wherein at least one of the one or more decision modules comprises: a plurality of inputs configured to receive respective event flags relating to events from respective sources, wherein each of the inputs is associated with a respective priority; OR logic configured to output a flag corresponding to the result of a logical OR operation on the event flags received at the plurality of inputs; identification logic configured to identify which of the inputs to receive an asserted flag has the highest priority; and an output register configured to store a source identifier of the source for which an asserted event flag is received at the identified input; wherein the prioritisation module is configured to allow the processor to read the source identifier from the output register of one of said one or more decision modules for use in identifying a source of an event to which the processor is to respond.

There is provided a method of using a prioritisation module implemented in hardware to prioritise events for a processor which is configured to respond to events from a plurality of sources, wherein the prioritisation module comprises one or more decision modules which each have a plurality of inputs associated with respective priorities, the method comprising: receiving respective event flags relating to events from respective sources at the inputs of at least one of the one or more decision modules; outputting from OR logic of the at least one decision module, a flag corresponding to the result of a logical OR operation on the event flags received at the plurality of inputs; for each of the at least one decision module, identifying which of the inputs of the decision module to receive an asserted flag has the highest priority; storing, in a respective output register of each of the at least one decision module, a source identifier of the source for which an asserted event flag is received at the identified input of the decision module; and the prioritisation module allowing the processor to read the source identifier from the output register of one of said one or more decision modules for use in identifying a source of an event to which the processor is to respond.

There may be provided computer readable code for generating a computer system or a prioritisation module as described in any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5 shows a schematic diagram of identification logic in an example.

Figure 1:
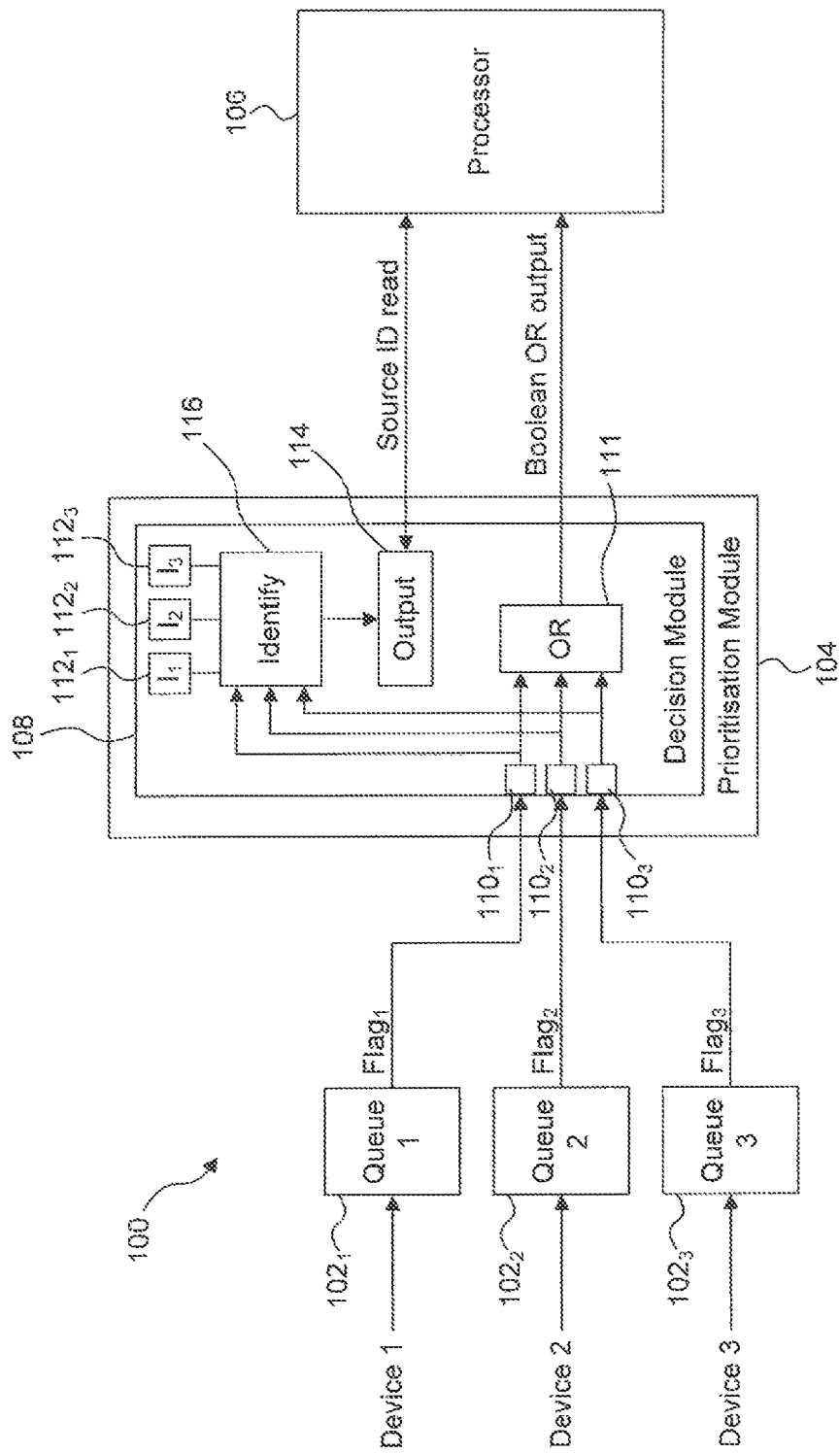
FIG. 1 shows a computer system in which events are prioritised for a processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

FIG. 1 shows a computer system 100 which comprises a plurality of event queues $102_1$, $102_2$ and $102_3$, a prioritisation module 104 and a processor 106. The queues 102 and the prioritisation module 104 are implemented in hardware, such that their functionality is offloaded from the processor 106. The event queues 102 are configured to store data relating to events which are waiting for a response from the processor 106. For example, in the computer system 100 shown in FIG. 1, each of the queues $102_1$ to $102_3$ is arranged to receive data relating to events generated by a respective device to which the processor 106 is to respond. That is, the event queue $102_1$ receives data relating to events generated by a first device ("Device 1"), the event queue $102_2$ receives data relating to events generated by a second device ("Device 2"), and the event queue $102_3$ receives data relating to events generated by a third device ("Device 3"). The devices might be peripheral devices or any other type of devices which generate events to which the processor 106 is to respond.

Each of the queues 102 is configured to provide an event flag to the prioritisation module 104 to indicate whether there is at least one event in the queue which is waiting for the processor 106 to respond. For example, the events may be removed from the queues 102 when the processor responds to the events, so the event flags provided from the event queues 102 to the prioritisation module 104 may be 'not empty' flags of the queues 102. The 'not empty' flag of a queue 102 is asserted when the queue 102 is not empty, i.e. when the queue includes at least some data relating to at least one event.

The prioritisation module 104 is arranged to receive the event flags from the queues 102. The prioritisation module 104 provides a Boolean OR output to the processor 106 to indicate whether there are any events waiting for a response from the processor 106. If there is at least one event to which the processor 106 is to respond, the processor can read a source identifier from the prioritisation module 104, as described in more detail below, in order to determine the source of the event. The prioritisation module 104 comprises a single decision module 108. In other examples described below with reference to FIGS. 3 and 4, the prioritisation module comprises a plurality of decision modules. It is noted that a "decision module" may also be referred to as a "logical OR module". The decision module 108 comprises a plurality of inputs $110_1$, $110_2$ and $110_3$ which are coupled to outputs of the respective event queues $102_1$, $102_2$ and $102_3$. The decision module 108 also comprises OR logic 111 configured to determine and output a flag corresponding to the result of a logical OR operation on the event flags received at the inputs $110_1$, $110_2$ and $110_3$. The decision module 108 also comprises a plurality of input registers $112_1$, $112_2$ and $112_3$ which are arranged to store source identifiers of the respective sources of the event flags. The source identifiers may, for example, comprise 8 bits. As an example, the source identifiers stored in the input registers 112 may be queue identifiers which identify one of the queues 102. For example, the input register $112_1$ may store a queue identifier identifying the queue $102_1$, the input register $112_2$ may store a queue identifier identifying the queue $102_2$, and the input register $112_3$ may store a queue identifier identifying the queue $102_3$. The source identifiers may be written into the input registers 112 when the decision module is configured in accordance with the sources that provide event flags to the corresponding inputs 110. The decision module 108 also comprises an output register 114 which is configured to store one of the source identifiers from the input registers 112 based on the event flags received at the inputs 110. The source identifier stored in the output register 114 can be read by the processor 106 to thereby provide the source identifier to the processor 106 to identify a source of an event to which the processor 106 is to respond. The decision module 108 also comprises identification logic 116 which is configured to identify which of the inputs 110 to receive an asserted flag has the highest priority, and to cause the source identifier from the input register 112 corresponding to the identified input to be written into the output register 114.

Figure 2:
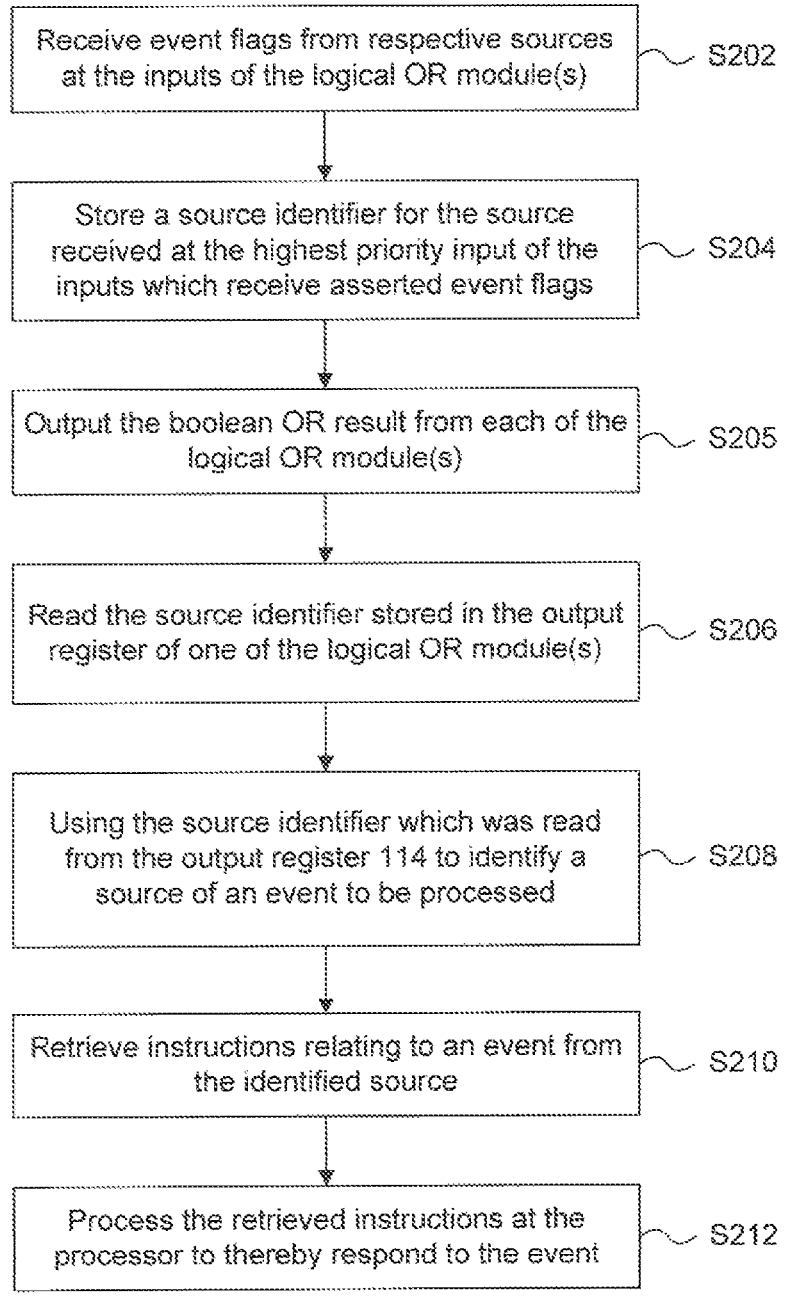
FIG. 2 shows a flow chart for a method of responding to events in a computer system.

A method of using the computer system 100 to respond to events is described with reference to the flow chart shown in FIG. 2. Each of the inputs $110_1$, $110_2$ and $110_3$ is associated with a respective priority. For example, the input $110_1$ may have a high priority, the input $110_2$ may have a medium priority and the input $110_3$ may have a low priority. As described in more detail below, the inputs 110 may receive asserted or non-asserted signals and the decision module 108 (in particular the identification logic 116) determines which of the inputs 110 to receive an asserted signal has the highest priority. In this way, the decision module 108 (in particular the identification logic 116) determines which is the highest priority asserted input.

Before the method begins, in a configuration stage, source identifiers (e.g. queue identifiers of the queues $102_1$, $102_2$ and $102_3$) are stored in the respective input registers $112_1$, $112_2$ and $112_3$, e.g. by a configuration tool, in conjunction with the configuration of which event flags are provided to which of the inputs 110. The source identifier stored in input register $112_1$ identifies the source of the signal provided to input $110_1$, so in this example input register $112_1$ stores the queue identifier for the queue $102_1$. The source identifier stored in input register $112_2$ identifies the source of the signal provided to input $110_2$, so in this example input register $112_2$ stores the queue identifier for the queue $102_2$. The source identifier stored in input register $112_3$ identifies the source of the signal provided to input $110_3$, so in this example input register $112_3$ stores the queue identifier for the queue $102_3$. The arrangement of which sources provide signals to which of the inputs 110 of the decision module 108 is configurable, and may be determined by configuration registers whose values are calculated by a configuration tool. In this way, the relative priorities of the sources are set (in a configurable manner). For example, in the embodiment shown in FIG. 1, events occurring at device 1 are high priority so the data relating to those events is stored in queue $102_1$ and the event flags are provided from the queue $102_1$ to the high priority input $110_1$ and the queue identifier for queue $102_1$ is stored in the input register $112_1$. Furthermore, in the embodiment shown in FIG. 1, events occurring at device 2 are medium priority so the data relating to those events is stored in queue $102_2$ and the event flags are provided from the queue $102_2$ to the medium priority input $110_2$ and the queue identifier for queue $102_2$ is stored in the input register $112_2$. Similarly, in the embodiment shown in FIG. 1, events occurring at device 3 are low priority so the data relating to those events is stored in queue $102_3$ and the event flags are provided from the queue $102_3$ to the low priority input $110_3$ and the queue identifier for queue $102_3$ is stored in the input register $112_3$. If the priorities of the events occurring at the devices change for some reason then the system 100 is configurable to change the arrangement of which sources provide signals to which of the inputs 110 of the decision module 108, and the source identifiers stored in the input registers 112 will be changed accordingly.

In step S202 event flags are received at the inputs of the decision module 108. In the example shown in FIG. 1, the event flags are the 'not empty' flags of the queues 102. In other examples, the event flags may be any other suitable indication that an event has occurred to which the processor 106 is to respond. The event flags received at the inputs 110 are asserted if the respective queues 102 are not empty, i.e. if there is an event for the processor 106 to respond to. In step S204 the identification logic 116 determines which of the inputs 110 which receive an asserted event flag has the highest priority. That is, the identification logic 116 determines the highest priority asserted input. The source identifier for the source received at the highest priority asserted input is stored in the output register 114. That is, for whichever input ($110_x$) is determined to be the highest priority asserted input, the source identifier stored in the corresponding input register ($112_x$) is copied into the output register 114. FIG. 5 shows an example of how the identification logic 116 may be implemented, but it will be clear to a person skilled in the art that the identification logic 116 may be implemented in other ways to achieve the functions of identifying the highest priority asserted input and writing the appropriate source identifier into the output register 114.

In the example shown in FIG. 5, the identification logic 116 is coupled to the inputs $110_1$, $110_2$ and $110_3$. The identification logic 116 is also coupled to the input registers $112_1$, $112_2$ and $112_3$. The identification logic 116 comprises two NOT gates 502 and 504, three AND gates 506, 508 and 510 and three switches 512, 514 and 516. A signal received at input $110_1$ is used to control the switch 512 and is also provided, via the NOT gate 502 to a first inputs of the AND gates 506 and 508. A signal received at input $110_2$ is provided to a second input of the AND gate 506 and is also provided, via the NOT gate 504 to a second input of the AND gate 508. An output of the AND gate 508 is provided to a first input of the AND gate 510. A signal received at input $110_3$ is provided to a second input of the AND gate 510. An output of the AND gate 506 is used to control the switch 514. An output of the AND gate 510 is used to control the switch 516. When the switch 512 is closed the source identifier stored in the input register $112_1$ can be written into the output register 114. When the switch 514 is closed the source identifier stored in the input register $112_2$ can be written into the output register 114. When the switch 516 is closed the source identifier stored in the input register $112_3$ can be written into the output register 114. In this way, if the input $110_1$ receives an asserted event flag then switch 512 is closed and switches 514 and 516 are open, such that the source identifier stored in the input register $112_1$ is written into the output register 114. If the input $110_1$ does not receive an asserted event flag and input $110_2$ does receive an asserted event flag then switch 514 is closed and switches 512 and 516 are open, such that the source identifier stored in the input register $112_2$ is written into the output register 114. If the inputs $110_1$ and $110_2$ do not receive an asserted event flags and input $110_3$ does receive an asserted event flag then switch 516 is closed and switches 512 and 514 are open, such that the source identifier stored in the input register $112_3$ is written into the output register 114. A new identifier may be written into the output register 114 each time the state of at least one of the switches (512, 514 or 516) changes.

In step S205 the OR logic 111 determines and outputs a flag corresponding to the result of a logical OR operation on the event flags received at the inputs 110. The Boolean OR output from the OR logic 111 is sent to the processor 106, to indicate to the processor 106 whether there is an event to which it is required to respond. The OR logic 111 may be implemented as a simple logical OR gate. The processor 106 may poll the Boolean OR output provided by the OR logic 111 to determine when it is asserted, e.g. the processor 106 may poll the output from the OR logic 111 when the processor 106 is ready to respond to the next event. Alternatively (or additionally) the Boolean OR output may be configured to interrupt the processor 106 when it is asserted. The Boolean OR output may be a single bit, e.g. a '1' to indicate that there is a pending event or a '0' to indicate that there is not a pending event for the processor 106.

In step S206, responsive to receiving an asserted flag from the OR logic 111, the processor 106 reads the source identifier stored in the output register 114.

Therefore, in steps S202 to S206 the prioritisation module 104 acts to determine which of the currently pending events the processor 106 should respond to next and allows the processor 106 to read, from the output register 111, the source identifier for the source of the next event to which the processor 106 is to respond. The source identifier stored in the output register 114 relates to the highest priority asserted input. The prioritisation module 104 is implemented in hardware, so the process of making the decision as to what to process next is offloaded from the processor 106 into hardware, which may result in a more efficient computer system 100.

In step S208 the processor 106 uses the source identifier which has been read from the output register 114 to identify the source of an event to which the processor 106 is to respond. Therefore, the processor 106 does not need to perform further processing steps to decide which event should be responded to next and to identify the source of the event: these processes are offloaded from the processor 106 to the prioritisation module 104.

In step S210 the processor 106 retrieves instructions relating to an event from the identified source. Then in step S212 the processor 106 processes the retrieved instructions to thereby respond to the event from the identified source. For example, if the source identifier is a queue identifier identifying one of the queues 102, then the processor 106 will retrieve data from the queue relating to the event and process the retrieved data.

As described above, the event could be a variety of different things which require a response from the processor 106 and the processor 106 may correspondingly respond to an event in one of a variety of different ways which is suitable to the particular event in question. For example, in a communications processing system, an event may be generated by hardware in response to the filling of a buffer of received sampled data. In another example, an event may be generated by software when a memory buffer can be released for re-use. The type of the event which is waiting for a response from the processor may be implicit, e.g. all events from a particular source may be of the same type. This would allow the processor to know the type of the event that is to be handled for the source before it begins the processing of the event. In other cases, the processor might not know what type of event is to be handled, but on contacting the source (as identified by the source identifier) the processor can determine the type of the event so that the event can be processed correctly.

In the examples described above, the source identifiers are queue identifiers. In other examples, the source identifiers could be offsets into a lookup table, wherein the lookup table comprises memory addresses which are to be accessed by the processor 106 to thereby respond to the events. That is, instructions for the processor 106 to execute in response to the events may be stored in a memory (e.g. in a memory of the computer system 100) and the memory address of the instructions for responding to a particular event is stored in the lookup table. An offset into the lookup table therefore identifies the memory address of the instructions for responding to the event, so the offset into the lookup table can be used as the source identifier for an event, which can be stored in the input registers 112 and the output register 114 and read by the processor 106 to allow the processor 106 to determine which event is to be responded to next.

Figure 3:
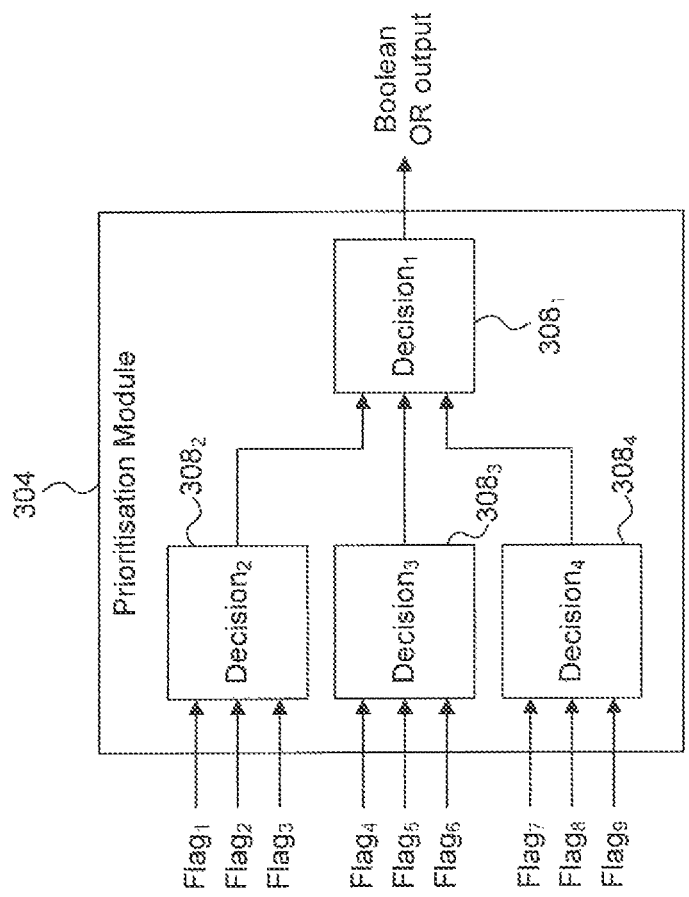
FIG. 3 shows a schematic diagram of a prioritisation module in one example.

In the example shown in FIG. 1, the prioritisation module 104 comprises a single decision module 108. In other examples, the prioritisation module may comprise a plurality of decision modules, wherein the output of the OR logic (i.e. the Boolean OR output) of at least one of the decision modules is coupled to an input of another one of the decision modules. For example, FIG. 3 shows an example of a prioritisation module 304 which can be used in a corresponding way as the prioritisation module 104 described above. The prioritisation module 304 comprises four decision modules $308_1$, $308_2$, $308_3$ and $308_4$ which are arranged in a hierarchy comprising two levels. A first of the levels comprises the first decision module $308_1$. A second of the levels comprises the second, third and fourth decision modules $308_2$, $308_3$ and $308_4$. Each of the decision modules 308 substantially corresponds to the decision module 108 described above, and includes corresponding components such as three inputs, three input registers, identification logic, an output register and OR logic. As shown in FIG. 3, the outputs of the OR logic of the second, third and fourth decision modules $308_2$, $308_3$ and $308_4$ are coupled to respective inputs of the first decision module $308_1$, and the output of the OR logic of the first decision module $308_1$ is configured to output a flag to the processor 106, wherein in response to receiving the flag, the processor can read a source identifier from the output register of the first decision module $308_1$ to thereby identify a source of an event to which the processor 106 is to respond, as described in more detail below.

The second decision module $308_2$ is arranged to receive three event flags ($Flag_1$, $Flag_2$ and $Flag_3$) which relate to events from respective sources. The input registers of the decision module $308_2$ store source identifiers (e.g. queue identifiers) identifying the sources of the events which relate to the event flags received at the respective inputs of the decision module $308_2$. As described above in relation to the decision module 108, the decision module $308_2$ stores in its output register the source identifier corresponding to the highest priority of its inputs which receive an asserted event flag. The output of the OR logic of the decision module $308_2$ (which is asserted if any of the inputs to the decision module $308_2$ are asserted) is received at a first input of the decision module $308_1$. The third decision module $308_3$ is arranged to receive three event flags ($Flag_4$, $Flag_5$ and $Flag_6$) which relate to events from respective sources. The input registers of the decision module $308_3$ store source identifiers (e.g. queue identifiers) identifying the sources of the events which relate to the event flags received at the respective inputs of the decision module $308_3$. The decision module $308_3$ stores in its output register the source identifier corresponding to the highest priority of its inputs which receive an asserted event flag. The output of the OR logic of the decision module $308_3$ (which is asserted if any of the inputs to the decision module $308_3$ are asserted) is received at a second input of the decision module $308_1$. The fourth decision module $308_4$ is arranged to receive three event flags ($Flag_7$, $Flag_8$ and $Flag_9$) which relate to events from respective sources. The input registers of the decision module $308_4$ store source identifiers (e.g. queue identifiers) identifying the sources of the events which relate to the event flags received at the respective inputs of the decision module $308_4$. The decision module $308_4$ stores in its output register the source identifier corresponding to the highest priority of its inputs which receive an asserted event flag. The output of the OR logic of the decision module $308_4$ (which is asserted if any of the inputs to the decision module $308_4$ are asserted) is received at a third input of the decision module $308_1$.

The input registers of the decision module $308_1$ store identifiers of the respective decision modules ($308_2$, $308_3$ and $308_3$) to which the corresponding inputs of the decision module $308_1$ are connected. The decision module $308_1$ (in particular the identification logic of the decision module $308_1$) is configured to: (i) determine which of the $2^{nd}$ tier decision modules ($308_2$ to $308_4$) provides the highest priority asserted input to the decision module $308_1$, (ii) fetch the source identifier from the output register of that $2^{nd}$ tier decision module, and (iii) store the fetched source identifier in the output register of the decision module $308_1$. In this way the decision module $308_1$ stores in its output register the source identifier corresponding to the highest priority of the asserted event flags (Flag$_1$ to Flag$_9$). The processor can read the source identifier from the output register of the decision module $308_1$. It is noted that the identification logic of the decision module $308_1$ is slightly different to the identification logic 116 described above because rather than simply writing one of the source identifiers from the input registers into the output register it performs the steps (i) to (iii) mentioned above. In this way the identification logic of the decision module $308_1$ fetches the source identifier from the output register of the $2^{nd}$ tier decision module ($308_2$, $308_3$ or $308_4$) which provides the highest priority input to the decision module $308_1$, and writes the fetched source identifier into the output register of the decision module $308_1$. The exact implementation of the identification logic of the decision module $308_1$ may be different in different examples and a person skilled in the art would know how to implement the identification logic of the decision module $308_1$ such that it has the desired functionality as described above.

In this way, the decision modules 308 of the prioritisation module 304 are arranged such that the source identifier corresponding to the highest priority asserted event flag (of the nine flags Flag$_1$ to Flag$_9$) is stored in the output register of the decision module $308_1$ and can be read by the processor 106 to indicate to the processor 106 which event to respond to next. That is, a source identifier corresponding to the highest priority asserted input to the prioritisation module 304 appears in the output register of the decision module $308_1$, thereby avoiding multi-stage reading of the different decision modules 308. That is, the processor 106 can just read the source identifier from the output register of the top decision module $308_1$ without needing to read any source identifiers from the other decision modules $308_2$ to $308_4$. The two tier hierarchy of the decision modules 308 shown in FIG. 3 allows up to nine event flags to be provided to the prioritisation module 304 (when each decision module 308 comprises three inputs) and the highest priority asserted event flag is determined. If there are fewer than nine sources with events occurring then some of the flags (F$_1$ to F$_9$) are not asserted. As described above, a configuration tool can arrange the order in which the event flags are coupled to the different inputs (with the corresponding source identifiers being stored in the corresponding input registers of the lower level decision modules $308_2$ to $308_4$), to thereby set the priorities with which the processor 106 responds to the events. In this way, the priorities assigned to different events are configurable.

Figure 4:
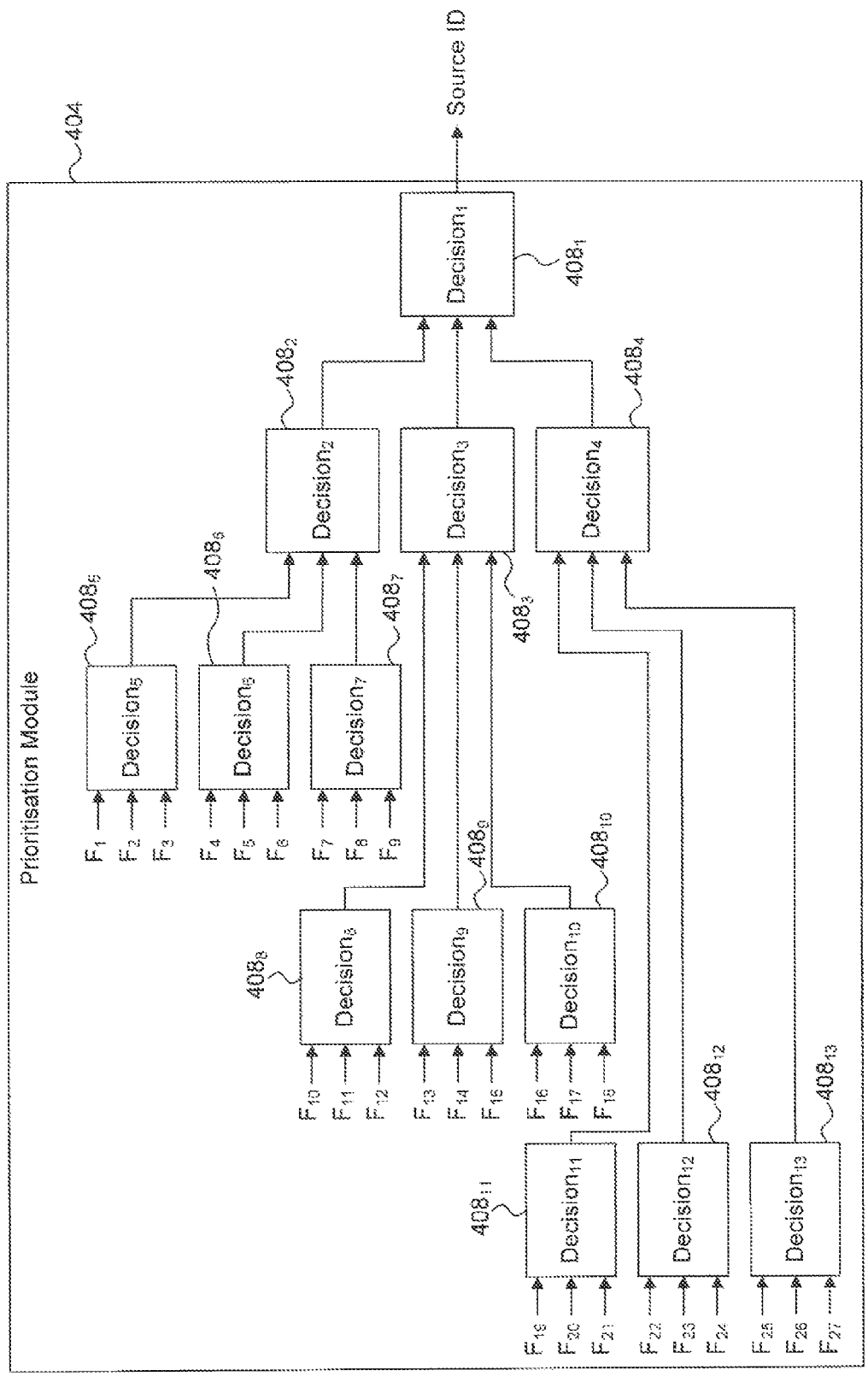
FIG. 4 shows a schematic diagram of a prioritisation module in another example.

As another example, FIG. 4 shows an example of a prioritisation module 404 which can be used in a corresponding way as the prioritisation modules 104 and 304 described above. The prioritisation module 404 comprises thirteen decision modules $408_1$ to $408_{13}$ which are arranged in a hierarchy comprising three levels. A first of the levels comprises the first decision module $408_1$. A second of the levels comprises the second, third and fourth decision modules $408_2$, $408_3$ and $408_4$. A third of the levels comprises the fifth to thirteenth decision modules $408_5$ to $408_{13}$. Each of the decision modules 408 substantially corresponds to the decision module 108 described above, and includes corresponding components such as three inputs, three input registers, identification logic, an output register and OR logic. As shown in FIG. 4, the outputs of the OR logic of the fifth, sixth and seventh decision modules $408_5$, $408_6$ and $408_7$ are coupled to respective inputs of the second decision module $408_2$; the outputs of the OR logic of the eighth, ninth and tenth decision modules $408_8$, $408_9$ and $408_{10}$ are coupled to respective inputs of the third decision module $408_3$; the outputs of the OR logic of the eleventh, twelfth and thirteenth decision modules $408_{11}$, $408_{12}$ and $408_{13}$ are coupled to respective inputs of the fourth decision module $408_4$; the outputs of the OR logic of the second, third and fourth decision modules $408_2$, $408_3$ and $408_4$ are coupled to respective inputs of the first decision module $408_1$; and the output of the OR logic of the first decision module $408_1$ is configured to output a flag to the processor 106, wherein in response to receiving the flag, the processor can read a source identifier from the output register of the first decision module $408_1$ to thereby identify a source of an event to which the processor 106 is to respond.

The cascading of the decision modules 408 works in a similar manner to the cascading of the decision modules 308 described above in relation to FIG. 3. That is, the fifth decision module $408_5$ is arranged to receive three event flags (F$_1$, F$_2$ and F$_3$) which relate to events from respective sources. The input registers of the decision module $408_5$ store source identifiers (e.g. queue identifiers) identifying the sources of the events which relate to the event flags received at the respective inputs of the decision module $408_5$. As described above in relation to the decision module 108, the decision module $408_5$ stores in its output register the source identifier corresponding to the highest priority of its inputs which receive an asserted event flag. The output of the OR logic of the decision module $408_5$ (which is asserted if any of the inputs to the decision module $408_5$ are asserted) is received at a first input of the decision module $408_2$. Similarly, the sixth decision module $408_6$ is arranged to receive three event flags (F$_4$, F$_5$ and F$_6$) and to store in its output register the source identifier corresponding to the highest priority of its inputs which receive an asserted flag. The output of the OR logic of the sixth decision module $408_6$ is provided to a second input of the decision module $408_2$. Similarly, the seventh decision module $408_7$ is arranged to receive three event flags (F$_7$, F$_8$ and F$_9$) and to store in its output register the source identifier corresponding to the highest priority of its inputs which receive an asserted flag. The output of the OR logic of the seventh decision module $408_7$ is provided to a third input of the decision module $408_2$. Similarly, the eighth decision module $408_8$ is arranged to receive three event flags (F$_{10}$, F$_{11}$ and F$_{12}$) and to store in its output register the source identifier corresponding to the highest priority of its inputs which receive an asserted flag. The output of the OR logic of the eighth decision module $408_8$ is provided to a first input of the decision module $408_3$. Similarly, the ninth decision module $408_9$ is arranged to receive three event flags (F$_{13}$, F$_{14}$ and F$_{15}$) and to store in its output register the source identifier corresponding to the highest priority of its inputs which receive an asserted flag. The output of the OR logic of the ninth decision module $408_9$ is provided to a second input of the decision module $408_3$. Similarly, the tenth decision module $408_{10}$ is arranged to receive three event flags (F$_{16}$, F$_{17}$ and F$_{18}$) and to store in its output register the source identifier corresponding to the highest priority of its inputs which receive an asserted flag. The output of the OR logic of the tenth decision module $408_{10}$ is provided to a third input of the decision module $408_3$. Similarly, the eleventh decision module $408_{11}$ is arranged to receive three event flags (F$_{19}$, F$_{20}$ and F$_{21}$) and to store in its output register the source identifier corresponding to the highest priority of its inputs which receive an asserted flag.

The output of the OR logic of the eleventh decision module $408_{11}$ is provided to a first input of the decision module $408_4$. Similarly, the twelfth decision module $408_{12}$ is arranged to receive three event flags ($F_{22}$, $F_{23}$ and $F_{24}$) and to store in its output register the source identifier corresponding to the highest priority of its inputs which receive an asserted flag. The output of the OR logic of the twelfth decision module $408_{12}$ is provided to a second input of the decision module $408_4$. Similarly, the thirteenth decision module $408_{13}$ is arranged to receive three event flags ($F_{25}$, $F_{26}$ and $F_{27}$) and to store in its output register the source identifier corresponding to the highest priority of its inputs which receive an asserted flag. The output of the OR logic of the thirteenth decision module $408_{13}$ is provided to a third input of the decision module $408_4$.

The input registers of the decision module $408_2$ store identifiers of the respective decision modules ($408_5$, $408_6$ and $408_7$) to which the corresponding inputs of the decision module $408_2$ are connected. The decision module $408_2$ (in particular the identification logic of the decision module $408_2$) is configured to: (i) determine which of the $3^{rd}$ tier decision modules ($408_5$ to $408_7$) provides the highest priority asserted input to the decision module $408_2$, (ii) fetch the source identifier from the output register of that $3^{rd}$ tier decision module, and (iii) store the fetched source identifier in the output register of the decision module $408_2$. In this way, the decision module $408_2$ stores in its output register the source identifier corresponding to the highest priority of the asserted event flags $F_1$ to $F_9$. The identification logic of the decision module $408_2$ is similar to the identification logic of the decision module $308_1$ described above with reference to FIG. 3, and as such is slightly different to the identification logic 116 described above in relation to FIG. 1. This is because rather than simply writing one of the source identifiers from the input registers into the output register the identification logic of the decision module $408_2$ performs the steps (i) to (iii) mentioned above, to thereby fetch the source identifier from the output register of the $3^{rd}$ tier decision module ($408_5$, $408_6$ or $408_7$) which provides the highest priority input to the decision module $408_2$, and writes the fetched source identifier into the output register of the decision module $408_2$. Similarly, the input registers of the decision module $408_3$ store identifiers of the respective decision modules ($408_8$, $408_9$ and $408_{10}$) to which the corresponding inputs of the decision module $408_3$ are connected. The decision module $408_3$ (in particular the identification logic of the decision module $408_3$) is configured to: (i) determine which of the $3^{rd}$ tier decision modules ($408_8$ to $408_{10}$) provides the highest priority asserted input to the decision module $408_3$, (ii) fetch the source identifier from the output register of that $3^{rd}$ tier decision module, and (iii) store the fetched source identifier in the output register of the decision module $408_3$. In this way, the decision module $408_3$ stores in its output register the source identifier corresponding to the highest priority of the asserted event flags $F_{10}$ to $F_{18}$. The identification logic of the decision module $408_3$ is similar to the identification logic of the decision module $308_1$ described above with reference to FIG. 3, and as such is slightly different to the identification logic 116 described above in relation to FIG. 1. This is because rather than simply writing one of the source identifiers from the input registers into the output register the identification logic of the decision module $408_3$ performs the steps (i) to (iii) mentioned above, to thereby fetch the source identifier from the output register of the $3^{rd}$ tier decision module ($408_8$, $408_9$ or $408_{10}$) which provides the highest priority input to the decision module $408_3$, and writes the fetched source identifier into the output register of the decision module $408_3$. Similarly, the input registers of the decision module $408_4$ store identifiers of the respective decision modules ($408_{11}$, $408_{12}$ and $408_{13}$) to which the corresponding inputs of the decision module $408_4$ are connected. The decision module $408_4$ (in particular the identification logic of the decision module $408_4$) is configured to: (i) determine which of the $3^{rd}$ tier decision modules ($408_{11}$ to $408_{13}$) provides the highest priority asserted input to the decision module $408_4$, (ii) fetch the source identifier from the output register of that $3^{rd}$ tier decision module, and (iii) store the fetched source identifier in the output register of the decision module $408_4$. In this way, the decision module $408_4$ stores in its output register the source identifier corresponding to the highest priority of the asserted event flags $F_{19}$ to $F_{27}$. The identification logic of the decision module $408_4$ is similar to the identification logic of the decision module $308_1$ described above with reference to FIG. 3, and as such is slightly different to the identification logic 116 described above in relation to FIG. 1. This is because rather than simply writing one of the source identifiers from the input registers into the output register the identification logic of the decision module $408_4$ performs the steps (i) to (iii) mentioned above, to thereby fetch the source identifier from the output register of the $3^{rd}$ tier decision module ($408_{11}$, $408_{12}$ or $408_{13}$) which provides the highest priority input to the decision module $408_4$, and writes the fetched source identifier into the output register of the decision module $408_4$. The input registers of the decision module $408_1$ store identifiers of the respective decision modules ($408_2$, $408_3$ and $408_4$) to which the corresponding inputs of the decision module $408_1$ are connected. The decision module $408_1$ (in particular the identification logic of the decision module $408_1$) is configured to: (i) determine which of the $2^{nd}$ tier decision modules ($408_2$ to $408_4$) provides the highest priority asserted input to the decision module $408_1$, (ii) fetch the source identifier from the output register of that $2^{nd}$ tier decision module, and (iii) store the fetched source identifier in the output register of the decision module $408_1$. In this way, the decision module $408_1$ stores in its output register the source identifier corresponding to the highest priority of the asserted event flags $F_1$ to $F_{27}$. The processor can read the source identifier from the output register of the decision module $408_1$. The identification logic of the decision module $408_1$ is similar to the identification logic of the decision module $308_1$ described above with reference to FIG. 3, and as such is slightly different to the identification logic 116 described above in relation to FIG. 1. This is because rather than simply writing one of the source identifiers from the input registers into the output register the identification logic of the decision module $408_1$ performs the steps (i) to (iii) mentioned above, to thereby fetch the source identifier from the output register of the $2^{nd}$ tier decision module ($408_2$, $408_3$ or $408_4$) which provides the highest priority input to the decision module $408_1$, and writes the fetched source identifier into the output register of the decision module $408_1$.

The decision modules 408 of the prioritisation module 404 are arranged such that the source identifier corresponding to the highest priority asserted event flag (of the twenty-seven flags $F_1$ to $F_{27}$) is stored in the output register of the decision module $408_1$ and can be read by the processor 106 to indicate to the processor 106 which event to respond to next. That is, a source identifier corresponding to the highest priority asserted input to the prioritisation module 404 appears in the output register of the decision module $408_1$, thereby avoiding multi-stage reading of the different decision modules 408. That is, the processor 106 can just read the source identifier from the output register of the top decision module $408_1$ without needing to read any source identifiers from the other decision modules $408_2$ to $408_{13}$. The three tier hierarchy of the decision modules 408 shown in FIG. 4 allows up to twenty seven event flags to be provided to the prioritisation module 404 (when each decision module 408 comprises three inputs) and the highest priority asserted event flag is determined. If there are fewer than twenty seven sources with events occurring then some of the flags ($F_1$ to $F_{27}$) are not asserted. As described above, a configuration tool can arrange the order in which the event flags are coupled to the different inputs (with the corresponding source identifiers being stored in the corresponding input registers of the $3^{rd}$ level decision modules $408_5$ to $408_{13}$), to thereby set the priorities with which the processor 106 responds to the events. In this way the priorities assigned to different events are configurable.

In the examples described above, each of the decision modules comprises three inputs. In other examples, the decision modules may comprise different numbers of inputs, e.g. two inputs or more than three inputs. In examples in which the prioritisation module comprises a plurality of decision modules then each of the decision modules may comprise the same number of inputs, or different ones of the decision modules may comprise different numbers of inputs. The different inputs of a decision module are associated with different relative priorities.

In the example computer system 100 shown in FIG. 1, there is just one processor 106. In other examples, there may be more than one processor in the computer system, and there may be a prioritisation module for each of the processors such that respective prioritisation modules can prioritise the events for the respective processors in the computer system.

There has been described herein various examples of computer systems in which the decision as to which event a processor should respond to next is offloaded from the processor and implemented in hardware in a prioritisation module. This can reduce the workload of the processor and thereby result in a more efficient computer system.

Those skilled in the art will realize that all, or a portion of the functionality, techniques or methods described herein may be carried out by a dedicated circuit, an application-specific integrated circuit, a programmable logic array, a field-programmable gate array, or the like. For example, the "module", "functionality", "component" or "logic" described herein may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a computer system and/or a prioritisation module configured to perform any of the methods described herein, or for generating a computer system and/or a prioritisation module comprising any apparatus described herein. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A computer system comprising:
a processor configured to respond to events from a plurality of sources; and
a prioritisation module implemented in hardware and configured to prioritise the events for the processor, the prioritisation module comprising one or more decision modules, wherein at least one of the one or more decision modules comprises:
a plurality of inputs configured to receive respective event flags relating to events from respective sources, wherein each of the inputs is associated with a respective priority;
OR logic configured to output a flag corresponding to the result of a logical OR operation on the event flags received at the plurality of inputs;
identification logic configured to identify which of the inputs to receive an asserted flag has the highest priority; and
an output register configured to store a source identifier of the source for which an asserted event flag is received at the identified input;
wherein the processor is configured to: (i) respond to receiving an asserted flag outputted by one of said one or more decision modules, by reading the source identifier stored in the output register of said one of the decision modules, and (ii) use said source identifier to identify a source of an event to which the processor is to respond.

2. The computer system of claim 1 wherein each of the at least one decision module further comprises input registers configured to store source identifiers of the sources of the event flags received at the inputs.

3. The computer system of claim 2 wherein the identification logic is configured to cause the source identifier from the input register corresponding to the identified input to be written into the output register.

4. The computer system of claim 1 wherein, responsive to reading the source identifier from the output register of said one of said one or more decision modules, the processor is configured to:
retrieve instructions relating to an event from the identified source; and
process the retrieved instructions to thereby respond to the event from the identified source.

5. The computer system of claim 1 further comprising event queues which are configured to:
store data relating to events; and
provide the event flags to the prioritisation module.

6. The computer system of claim 5 wherein each of the event queues is configured to store data relating to events generated by a respective device to which the processor is to respond.

7. The computer system of claim 5 wherein the source identifiers are queue identifiers.

8. The computer system of claim 1 wherein the source identifiers are offsets into a lookup table, wherein the lookup table comprises memory addresses which are to be accessed by the processor to thereby respond to the events.

9. The computer system of claim 1 wherein each of the at least one decision module comprises three inputs.

10. The computer system of claim 1 wherein the prioritisation module comprises a single decision module.

11. The computer system of claim 1 wherein the prioritisation module comprises a plurality of decision modules, wherein the output of the OR logic of at least one of the decision modules is coupled to an input of another one of the decision modules.

12. The computer system of claim 11 wherein the prioritisation module comprises four decision modules arranged in a hierarchy comprising two levels;
wherein a first level comprises a first of the decision modules and a second level comprises a second, a third and a fourth of the decision modules;
wherein the outputs of the OR logic of the second, third and fourth decision modules are coupled to respective inputs of the first decision module, and wherein the OR logic of the first decision module is configured to output a flag to the processor, and wherein the output register of the first decision module is configured to store a source identifier which identifies a source of an event to which the processor is to respond.

13. The computer system of claim 11 wherein the prioritisation module comprises thirteen decision modules arranged in a hierarchy comprising three levels;
wherein a first level comprises a first of the decision modules; a second level comprises a second, a third and a fourth of the decision modules; and a third level comprises a fifth, a sixth, a seventh, an eighth, a ninth, a tenth, an eleventh, a twelfth and a thirteenth of the decision modules;
wherein the outputs of the OR logic of the fifth, sixth and seventh decision modules are coupled to respective inputs of the second decision module,
wherein the outputs of the OR logic of the eighth, ninth and tenth decision modules are coupled to respective inputs of the third decision module,
wherein the outputs of the OR logic of the eleventh, twelfth and thirteenth decision modules are coupled to respective inputs of the fourth decision module,
wherein the outputs of the OR logic of the second, third and fourth decision modules are coupled to respective inputs of the first decision module,
and wherein the OR logic of the first decision module is configured to output a flag to the processor, wherein the output register of the first decision module is configured to store a source identifier which identifies a source of an event to which the processor is to respond.

14. The computer system of claim 1 wherein the arrangement of which sources relate to event flags provided to which of the inputs of the at least one decision module of the prioritisation module is configurable.

15. A method of responding to events in a computer system comprising a processor configured to respond to events from a plurality of sources, and a prioritisation module implemented in hardware and configured to prioritise the events for the processor, wherein the prioritisation module comprises one or more decision modules which each have a plurality of inputs associated with respective priorities, the method comprising:
receiving respective event flags relating to events from respective sources at the inputs of at least one of the one or more decision modules;
outputting, from OR logic of the at least one decision module, a flag corresponding to the result of a logical OR operation on the event flags received at the plurality of inputs;
for each of the at least one decision module, identifying which of the inputs of the decision module to receive an asserted flag has the highest priority;
storing, in a respective output register of each of the at least one decision module, a source identifier of the source for which an asserted event flag is received at the identified input of the decision module;
responsive to the processor receiving an asserted flag outputted by one of said one or more decision modules, the processor reading the source identifier stored in the output register of said one of the decision modules; and
the processor using the source identifier to identify a source of an event to which the processor is to respond.

16. The method of claim 15 further comprising:
storing, in input registers, source identifiers of the sources of the event flags received at the inputs of the at least one decision module; and
for each of the at least one decision module, writing the source identifier from the input register corresponding to the identified input into the output register.

17. A prioritisation module implemented in hardware and configured to be coupled to a processor configured to respond to events from a plurality of sources, wherein the prioritisation module is configured to prioritise the events for the processor, the prioritisation module comprising:
one or more decision modules, wherein at least one of the one or more decision modules comprises:
a plurality of inputs configured to receive respective event flags relating to events from respective sources, wherein each of the inputs is associated with a respective priority;
OR logic configured to output a flag corresponding to the result of a logical OR operation on the event flags received at the plurality of inputs;

identification logic configured to identify which of the inputs to receive an asserted flag has the highest priority; and an output register configured to store a source identifier of the source for which an asserted event flag is received at the identified input;

wherein the prioritisation module is configured to allow the processor to read the source identifier from the output register of one of said one or more decision modules for use in identifying a source of an event to which the processor is to respond.

18. The prioritisation module of claim 17 wherein each of the at least one decision module further comprises input registers configured to store source identifiers of the sources of the event flags received at the inputs, and wherein the identification logic is configured to cause the source identifier from the input register corresponding to the identified input to be written into the output register.

19. The prioritisation module of claim 17 wherein the prioritisation module comprises either:
a single decision module, or
a plurality of decision modules, wherein the output of the OR logic of at least one of the decision modules is coupled to an input of another one of the decision modules.

20. A non-transitory computer readable storage medium having stored thereon processor executable instructions that when executed cause at least one processor to generate a prioritisation module which is configured to be coupled to a processor configured to respond to events from a plurality of sources, wherein the prioritisation module is configured to prioritise the events for the processor, and wherein the prioritisation module comprises:

one or more decision modules, wherein at least one of the one or more decision modules comprises:
a plurality of inputs configured to receive respective event flags relating to events from respective sources, wherein each of the inputs is associated with a respective priority;
OR logic configured to output a flag corresponding to the result of a logical OR operation on the event flags received at the plurality of inputs;
identification logic configured to identify which of the inputs to receive an asserted flag has the highest priority; and
an output register configured to store a source identifier of the source for which an asserted event flag is received at the identified input;

wherein the prioritisation module is configured to allow the processor to read the source identifier from the output register of one of said one or more decision modules for use in identifying a source of an event to which the processor is to respond.

* * * * *